United States Patent [19]

Haasl et al.

[11] 4,372,982

[45] Feb. 8, 1983

[54] REFRIGERATED SHELF STABLE DOUGH

[75] Inventors: Michael J. Haasl, Minneapolis; Kenneth D. Snider, Le Sueur; William L. Murphy, Golden Valley, all of Minn.

[73] Assignee: The Pillsbury Company, Minneapolis, Minn.

[21] Appl. No.: 275,008

[22] Filed: Jun. 18, 1981

Related U.S. Application Data

[63] Continuation of Ser. No. 117,312, Jan. 31, 1980, abandoned.

[51] Int. Cl.$^3$ .................... A21D 6/00; A21D 10/02
[52] U.S. Cl. ............................. 426/549; 426/556; 426/559; 426/319; 426/496
[58] Field of Search ............ 426/549, 316, 319, 556, 426/559, 410, 418, 653, 446, 498, 128, 404, 496

[56] References Cited

U.S. PATENT DOCUMENTS

| 3,407,078 | 10/1968 | Schlichter | 426/418 |
| 3,692,535 | 9/1972 | Norsby et al. | 426/556 |
| 3,718,483 | 2/1973 | Davis et al. | 426/404 |
| 4,038,428 | 1/1977 | Davis, Jr. | 426/410 |

OTHER PUBLICATIONS

Miller, B. S. & Trimbo, H. B., "Factors Affecting the Quality of Pie Dough and Pie Crust", *The Baker's Digest*, Feb. 1970; pp. 46–55.

*Primary Examiner*—Raymond N. Jones
*Assistant Examiner*—Elizabeth J. Curtin
*Attorney, Agent, or Firm*—Robert J. Lewis; Michael D. Ellwein; Mart C. Matthews

[57] ABSTRACT

A dough composition for making quality, thinly sheeted farinaceous food products such as pie crust or the like and which is shelf stable. The dough composition contains a high-starch, low-enzyme flour, shortening, water, gluten and preservatives. The composition is particularly adapted for making a pie dough which, during manufacture, is pre-sheeted and folded twice for packaging, and then is unfolded by the consumer for use.

9 Claims, No Drawings

REFRIGERATED SHELF STABLE DOUGH

This is a continuation of application Ser. No. 117,312 filed Jan. 31, 1980, now abandoned.

FIELD OF THE INVENTION

The present invention relates to a pie crust and a pie crust formulation from which a folded pie crust or the like can be made.

BACKGROUND OF THE INVENTION

For centuries, people have made pie crust by hand, generally just prior to making a pie. The crust-making process is somewhat difficult, timeconsuming, messy, and very often is a source of frustration for the pie-maker. Pies were once a traditional food item, but because of the inconvenience and the lack of time that people have for making pies, pies have fallen somewhat into disfavor. In today's environment of desire to quickly prepare meals with food products of high quality, there has been a long-felt need for eliminating the crust-making portion of the pie-making procedure. Thus, it would be highly desirable to provide a ready-to-use, high quality pie crust which would simplify the making of pies by eliminating the pie crust making portion of the pie making process.

Currently, prepared pie crusts are available in frozen form and are completely formed and in their own baking pans. However, the quality of such crusts is not very good. Furthermore, they are extremely fragile, require a significant amount of storage space in the household freezer, and are not very convenient for making two-crust pies. Numerous attempts have been made to provide a non-frozen pie crust either in sheeted form or in a ball or stick "add water and mix" form which would be rolled out into the sheet form by the consumer. These pie crusts have to date met limited consumer acceptance primarily because of lack of complete convenience with the ball and stick mix forms and because of poor quality with the sheet form.

In the past, The Pillsbury Company provided an alternative to the above-described ready-to-use pie crusts by having a refrigerated folded pie crust which was in sheeted form and the only steps necessary for use were unpackaging, unfolding, and placing the pie crust in the pie pan. However, this pie crust had some shortcomings, foremost among them, excessive browning during the baking of the product which had been held for an extended shelf life (e.g., 45 days or more). Other major problems included off flavors and cracking upon unfolding the crust. However, market tests indicated that the concept of a folded pie crust would meet with high consumer acceptance if the problems exhibited by the pie crusts could be overcome.

The present invention overcomes the problem of excessive baked browning of a pre-folded pie crust late in shelf life as well as eliminates or reduces the flavor problem and considerably reduces the cracking. Excessive browning of the baked product had not been a problem in the pie crust which was relatively freshly made, for example, less than 35 days, but commercial distribution requires 75 to 90 days of refrigerated shelf life. The described pie crust of this invention does not brown excessively during baking throughout 90 days of refrigerated shelf life and has been shown to be of high quality throughout that shelf life.

By controlling the composition of the formulation as hereinafter described, a pie crust of acceptable quality can be made which exhibits good flakiness, non-greasiness and good browning characteristics after extended shelf life while substantially reducing cracking upon unfolding.

DETAILED DESCRIPTION OF THE INVENTION

The following disclosure will be directed to the making of a pie crust; however, it is to be understood that food products other than pie crusts such as pizza crusts, puff pastry, tortillas, etc., can be produced similarly. The following formulation can be used to produce a farinaceous food product which is adapted for refrigerated storage having a shelf life of about 90 days. What is meant by refrigerated storage is that the product can be stored in an uncooked condition at a temperature of about 40° to 45° F. for a shelf life of up to 90 days and still produce a high quality product which browns properly, tastes good, exhibits flakiness, and is resistant to cracking when unfolded.

The dough broadly includes a high-starch, low-enzyme flour, shortening, water, salt, gluten (optional), a preservative system and food coloring.

The flour composition is of major importance in reducing Maillard browning during baking, particularly after extended shelf life, particularly in the range of between about 35 days and about 100 days.

The desirable flour has a high starch level, low enzyme level and minimal starch damage. Because such a flour is difficult to obtain as a standard product, it has been found desirable to modify a standard flour by adding additional starch thereto to achieve a flour component having a high starch level and a low enzyme level (hereinafter this will be referred to as the flour blend). Any suitable starch can be added, such as wheat flour starch, potato starch, corn starch, tapioca starch, etc. In modifying typical standard flours, it is preferred that the flour blend composition consist of between about 30% and about 70% by weight added starch on a dry starch/dry flour basis and more preferably between about 40% and about 60% and most preferably between about 45% and about 55% added starch (typical standard flour contains about 84% to about 89% dry starch by weight of dry flour). Thus, the flour blend contains between about 92% and about 98% starch (dry starch basis), more preferably between about 93% and about 97% starch and most preferably between about 94% and about 96% starch by weight of dry flour blend. Thus, the dry starch fraction of the dough is between about 37% and about 47%, more preferably between about 39% and about 45% and most preferably between about 40% and about 44% by weight.

The flour blend is present in the dough in a range of between about 38% and about 50% by weight of the dough, with this range being based on dry flour blend weight, and preferably between about 40% and about 48%, and more preferably between about 42% and about 46%.

Preferably, the flour blend contains less than about 0.2 absorption units of enzymes in the dry flour, more preferably less than about 0.1 absorption units and most preferably less than about 0.5 absorption units as measured by spectrophotometry in the following test procedure.

One gram of flour was blended for 45 seconds in a Lourdes mixer with 50 ml of 0.1 molar pH 6.5 phosphate (K) buffer. After centrifuging, 1 ml of the clear supernatant was pipetted into a 1 cm spectrophotometer cell along with 1 ml of a 0.02 molar quaiacol solution. The temperature was 25° C. 1 ml of 0.3% hydrogen peroxide solution was added rapidly, contents of the cell mixed, and timing commenced. Absorbance at 470 nm was recorded after 1 minute and again after 2 minutes. Absorbance at 470 nm after 2 minutes for 20 mg sample/ml was taken as the peroxidase activity of the sample.

The enzyme type which is of concern in the above-cited levels and test is peroxidase which is used as an indicator enzyme to indicate total enzyme activity of the flour blend. Typical standard flours have enzyme activity of 0.4 to 1.5 absorption units by this test procedure.

The reason for having a low enzyme level is that the enzymes affect the rate of hydrolysis of starch into sugars and this affects the baked browning (Maillard browning) at the end of shelf life. Maillard browning is a result of chemical reactions that require reducing sugars and amino acids as reactants and the amount of browning is dependent on the concentrations of the reactants present. Thus, if too much hydrolysis occurs, then the reducing sugars will accumulate and excessive Maillard browning after extended shelf life will occur as is evidenced by the following table.

BROWNING AS A FUNCTION OF LEVEL OF ENZYMES IN FLOUR
Browning of Edge of Crust

| Experiment # | Variable | Enzyme* Level | Time at 70° F. (Days) | | | | |
|---|---|---|---|---|---|---|---|
| | | | 2 | 4 | 8 | 9 | 14 |
| 1 | Control | 1.0–1.5 | 4 | 6 | 6 | 7 | 5.5 |
| | Low Enzyme | .05–.1 | 3 | 5.5 | 5 | 3.5 | 5.5 |
| | | | 1 | 4 | 7 | 10 | |
| 2 | Control | 1.0–1.5 | 7.3 | 8 | 6.5 | 7.5 | |
| | Low Enzyme | .05–.1 | 5 | 6 | 5 | 6 | |
| | | | 0 | 5 | 10 | 14 | 17 |
| 3 | Medium Level | .3–.8 | 6 | 7 | 7 | 8 | 10 |
| | Low Enzyme | .03–.05 | 6 | 6 | 6 | 6 | 6 |

Key for browning:
Scale of 0–10
0 = White, No Browning
10 = Charred, Extremely High Browning

*Flour blend enzyme level as measured by the indicator enzyme peroxidase, in absorption units, as described on page 6.

Excessive Maillard browning can also be caused by excessive physical damage to the starch granule, which makes the starch molecules more susceptible to hydrolysis and again leads to an accumulation of reducing sugars. Therefore, it is preferred to have a flour blend with starch damage of less than 10%, more preferably less than about 5% and most preferably less than about 3% by weight as measured by the AACC method 76-30A. By keeping the starch quantities above minimal levels and starch damage below maximum levels and a low amount of enzymes in the flour blend, excessive browning can be prevented through 90 days of refrigerated shelf life as is evidenced by Tables II and III below:

TABLE 2
SHELF-LIFE BROWNING AS A FUNCTION OF STARCH
Browning of Edge of Crust

| | Time at 40° F. (Weeks) | | | |
|---|---|---|---|---|
| | 1 | 3 | 6 | 9 |
| 0% Starch* | 5 | 6 | 6 | 6 |
| 50% Starch | 2 | 3 | 5 | 4 |

| | Time at 40° F. (Weeks) | Time at 70° F. (Days) | | | |
|---|---|---|---|---|---|
| | 1 | 3 | 4 | 9 | 11 | 16 |
| 0% Starch | 6 | 6 | 7 | 7 | 8 | 9 |
| 33% Starch | 6 | 5 | 5 | 6 | 6 | 7 |
| 67% Starch | 4 | 3.4 | 3.5 | 3 | 4 | 4 |

| | Time at 40° F. (Weeks) | | |
|---|---|---|---|
| | 4 | 6½ | 9½ |
| 0% Starch | 9.8 | 9.5 | 9.2 |
| 50% Starch | 7 | 8 | 8.2 |

| | Time at 40° F. (Weeks) | | |
|---|---|---|---|
| | 0 | 6 | 9 |
| 15% Starch | 5 | 8.7 | 9 |
| 30% Starch | 5 | 8.5 | 8.5 |
| 45% Starch | 4.3 | 7.7 | 7.7 |

Key for browning:
Scale of 0–10
0 = White, No Browning
10 = Charred, Extremely High Browning

*Percentage of starch given as added dry starch per dry flour blend on a weight basis.

TABLE 3
SHELF-LIFE BROWNING AS A FUNCTION OF STARCH
Browning of Center of Crust

| | Time at 40° F. (Weeks) | | | |
|---|---|---|---|---|
| | 1 | 3 | 6 | 9 |
| 0% Starch | 5 | 6 | 6 | 6 |
| 50% Starch* | 2 | 3 | 4 | 3 |

| | Time at 40° F. (Weeks) | Time at 70° F. (Days) | | |
|---|---|---|---|---|
| | 1 | 3 | 11 | 16 |
| 0% Starch | 4 | 6 | 7 | 7 |
| 33% Starch | 4 | 4.5 | 5 | 5 |
| 67% Starch | 1 | 3.5 | 2 | 1 |

| | Time at 40° F. (Weeks) | | |
|---|---|---|---|
| | 4 | 6½ | 9½ |
| 0% Starch | 8 | 8 | 8.8 |
| 50% Starch | 4.2 | 6 | 7.2 |

| | Time at 40° F. (Weeks) | | |
|---|---|---|---|
| | 0 | 6 | 9 |
| 15% Starch | 3.7 | 7.3 | 7.3 |
| 30% Starch | 3.5 | 6.5 | 6.0 |
| 45% Starch | 2.8 | 6.0 | 6.0 |

Key for browning:
Scale of 0–10
0 = White, No Browning
10 = Charred, Extremely High Browning
*Percentage of starch given as added dry starch per dry flour blend on a weight basis.

It has also been found that by having high levels of starch and low levels of protein in the dough that flakiness can be improved as illustrated in Table IV.

TABLE IV
Visual Flakiness as a Function of Starch, Shelf-life

| | Time at 70° F. (Days) | | | |
|---|---|---|---|---|
| | 4 | 9 | 11 | 16 |
| 0% starch* | 4 | 2 | 1 | 1 |
| 33% starch | 5 | 7 | 6 | 5 |
| 67% starch | 7 | 7 | 7 | 10 |
| | 4 | 6½ | 9½ | |
| 0% starch | 2 | 2 | 5 | |
| 50% starch | 7 | 8.5 | 8 | |

TABLE IV-continued
Visual Flakiness as a Function of Starch, Shelf-life

Time at 70° F. (Days)

Scale: 0-10
0 = non-flaky appearance
10 = extremely flaky appearance

*Percentage starch given as added dry starch by dry flour blend on a weight basis.

Too high levels of starch will result in a dough of such low protein levels that the dough will be weak and fragile. Such a fragile dough will not process well and will crack excessively upon unfolding the crust before baking. What is meant by excessive cracking is the existence of one or more cracks greater than 1 inch in length. This is because the protein network is needed to hold the starch and dough together and when the protein level is reduced, the network is weakened resulting in a fragile dough.

The protein level that is used to provide an adequate network to prevent excessive cracking depends on the way the dough is handled during the process. For example, if the dough is hand folded, the process is more gentle and requires less protein than if the crusts are machine folded. In the case of hand folding, a minimum of about 3% protein by weight of dry flour blend is required. In this case, the range of protein by dry flour blend weight base is about 3% to about 12%, preferably about 3.5% to about 10% and more preferably about 4% to about 8%. In the case of machine folding, a higher level of protein may be required and this may be accomplished by blending with the flour additional wheat gluten in the range generally between about 2% and about 4% by weight based on dry flour blend weight. The total amount of protein in the flour blend in the machine folded case should be a minimum of about 4.5% by weight of dry flour blend. In this case the range of protein should be about 4.5% to about 12%, preferably about 5.5% to about 10% and more preferably about 6% to about 8%.

In the dough, in the case of hand folding, protein should be present on a weight basis in the range of between about 1.5% to about 6%, preferably 1.7% to about 5% and most preferably in the range of between about 2% and about 4%. In the case of machine folding, it is preferred that protein be present in the dough in the range of between about 2.2% and about 6% by weight, preferably between about 2.7% and about 5% and most preferably between about 3% and about 4% by weight.

Dry standard flour is in the dough, preferably in a range of between about 17% and about 27% by weight, more preferably between about 19% and about 25% and most preferably between about 21% and about 23%. These ranges, however, may change depending upon the type of flour used.

Shortening is necessary at relatively high levels to give the desired texture of baked pie crust. The preferred shortening level is in the range of between about 24% and about 35% of the total weight of the dough, more preferably between about 26% and about 34% and most preferably between about 28% and about 32%. If the shortening level is too low, the baked product will not have the desired tenderness; if the level is too high, the product will become difficult to process, may crack excessively upon unfolding the pre-folded crust and the baked product used in a two crust filled pie may acquire an oily texture.

The preferred shortening is prime steam lard, about 1% to about 10% of which has been fully hydrogenated. It has a solid fat index (SFI) at 50° F. of about 29 to about 36, preferably about 30 to about 35 and more preferably about 31 to about 33 as measured by the standard AOCS dilatometry method CD10-57. The shortening has a Wiley melting point of at least about 108° F. as measured by test procedure 28.009 as found in the 12th edition of *Methods of Analysis* by the AOAC. Preferably, the Wiley melting point is between about 108° F. and about 118° F., more preferably between about 110° F. and about 115° F. and most preferably between and including about 111° F. and about 113° F. A preferred shortening is lard or any other shortening having the following fatty acid composition: $C_{14}$, 0-3%; $C_{14:1}$, 0-1%; $C_{16}$, 23-28%; $C_{16:1}$, 1-5%; $C_{18}$, 14-20%; $C_{18:1}$, 41-46%; $C_{18:2}$, 8-11% on a mole basis as determined by the Iverson method in *Journal of AOAC* 48, 3, p. 482 (1968).

If the shortening has an SFI value exceeding about 36 and/or a Wiley melting point exceeding about 118° F., the product will be difficult to process without splitting the thin dough sheet during sheeting and the product will also crack excessively upon unfolding. If the shortening has an SFI value of less than about 29 and/or a Wiley melting point of less than about 108° F., a baked product used in a two-crust filled pie becomes excessively greasy and oily.

Also, it is preferred that the shortening be deodorized and have free fatty acids of less than or equal to about 0.2% by weight of total shortening (by the official method of the AOCS, CA 5A-40) and a peroxide value of less than or equal to about 3 milli-equivalents per kg of total shortening (by AOCS official method CD 8-53). By having this level of free fatty acids and the proper level of peroxide value, rancidity can be eliminated.

Water is present in the dough. The water is introduced into the dough generally by two means: the flour blend contains a certain amount of water, and water is normally added to the dough as a separate ingredient. The total water in the dough is preferably in the range of between about 19% and about 25% by weight of dough, more preferably in the range of between about 20% and about 24% and most preferably between about 21% and about 23%. Given typical moisture levels for flour blend, water will be added to the dough as a separate item in the range of between about 14% and about 20% by weight of dough, more preferably between about 14.5% and about 18.5% and most preferably in the range of between about 15% and about 17%.

In the preferred formulation, an antimycotic preservative system is added to prevent molding. A preferred preservative system which has been found effective to prevent mold growth at 40° F. for about 90 days is sodium propionate in the range of between about 0.05% and about 0.6% by weight of the dough and potassium sorbate in the range of between about 0.05% and about 0.15% by weight of total composition and citric acid in an amount up to about 0.07% by weight of dough.

Salt is added to the composition at a level of about 1.2% to about 2% by weight of dough for flavor purposes and also to reduce water activity. The water activity should be between about 0.9 and about 0.94 as measured by the standard method of electric hygrometry.

The pH of the dough is also important in preventing molding by enhancing the effectiveness of the preservative system. Preferably, the pH of the dough is between about 5.0 and about 5.6. Dough pH can be controlled by bleaching the flour and also by the addition of citric acid.

Food coloring can also be added to the dough in minor amounts. In a preferred form of the present invention, FD & C yellow #5 can be added in an amount of up to about 0.001% by weight of dough and FD & C red #3 can be added in an amount up to about 0.0001% by weight of the dough.

In the process of making dough, shortening, either in liquid form or solid form, is added to the chilled flour. The ingredients are mixed to disperse the shortening and flour to form a blend. Either during or after the shortening addition, water is added with additional mixing to disperse the water within the mixture and to hydrate and develop gluten. The other ingredients, such as salt, preservatives and color, are added with the water. In order to produce a long-flake crust, it is desirable to have small pellets of shortening 1/16 to ⅜ inch in diameter in the dough.

To produce small pellets of the correct size, it is desired that the flour blend be chilled before mixing with the shortening. When using heated liquid shortening, preferably slightly above its melting point, it has been found that having the flour blend at a temperature between about −40° F. and about −20° F. will achieve the formation of adequate shortening pellets. When using solid fat, it has been found that using flour at a temperature of less than about 50° F. has been suitable. After the shortening and flour blend have started mixing, water is added. The temperature of the flour, shortening and other components should be such that after the dough has been mixed, it is at a temperature in the range of between about 50° F. and about 70° F., more preferably in the range of between about 55° F. and about 65° F. and most preferably is about 60° F.

It has been found that exposing the dough to vacuum above a certain level and for a certain time period, significant improvements in dough characteristics and product quality can be obtained. For example, the dough becomes significantly stronger and more extensible. Also, the baked product is significantly flakier. The subjection or exposure of the dough to the vacuum process can occur at any time after the start of the mixing of the dough to achieve the heretofore described improvements.

The application of vacuum should be such that the dough is exposed to a vacuum of at least about 27.5 inches of mercury, more preferably at least about 28 inches of mercury and most preferably about 29 inches of mercury. The required time of exposure depends upon the level of vacuum, whereby the higher the vacuum level, the lower the exposure time and conversely. The time of exposure is that time period which the vacuum level is at least equal to or exceeds the minimum prescribed vacuum level. Thus, the time of exposure to the minimum vacuum level should exceed at least about 0.5 seconds, more preferably at least about 1 second and most preferably at least about 3 seconds. However, for a large dough mass, four minutes or more exposure time may be required.

The dough should be allowed to expand during the application of the vacuum or the previously described characteristics will not occur. The application of vacuum at the prescribed level expands the dough volumetrically at least about 1.1 times the initial volume of the dough (i.e., a 10% increase in volume). If the dough is in sheet form of up to about ¼ inch thick, the dough may expand about 1.5 times the original volume (a 50% increase).

The expansion of the dough is dependent on the flexibility of the dough and, hence, is dependent on its temperature. The temperature of the dough during vacuum exposure should be at least about 55° F., more preferably at least about 65° F. and most preferably about 75° F.

The change in the dough characteristics after subjection to vacuum can be attributed to a modification of the dough structure. After the dough is mixed, it normally contains many relatively large gas or air cells that can be seen under a light microscope with a 10× magnification. After subjection of the dough to the vacuum process, the majority of the air cells disappear from the dough. The vacuum process expands the air cells and at the prescribed vacuum conditions, the air cells overcome the tensile strength of the dough and are released. The increased extensibility and strength of the dough is due to a more uniform dough structure. One explanation for increased flakiness of the baked product may also come from a reduced number of air cells in the dough. For example, if the air cells are found uniformly through the dough in great numbers, the dough expands uniformly during baking resulting in a uniform, non-flaky appearance. With fewer air cells, the dough can expand in discrete areas of the crust during baking, which results in a flakier appearance of the final baked product.

The dough can be used and further processed as desired. For making pie crusts or the like, the dough is sheeted with any suitable sheeting apparatus. During the sheeting operation, it is preferred that the dough be at least about 55° F. to prevent disruption of the continuous sheet, and the temperature should not exceed about 75° F., as the material may become difficult to process.

After sheeting, the dough is cut and folded. Preferably, a separating sheet is positioned on opposite sides of the pie crust. The pie crust is then packaged in a heat sealable pouch or the like.

In final form the dough may be packaged in an atmosphere of fat and/or water soluble gas. This aids in maintaining the highly flaky character of the dough which has been vacuum processed.

The gas should have a solubility at 20° C. and atmosphere pressure of at least about 0.1 volumes of gas per volume of water and/or at least 0.05 volumes of gas per volume of shortening. Particularly suitable gases are $CO_2$ and $N_2O$.

It is to be understood that while there has been illustrated and described certain forms of the present invention, it is not to be limited to the specific form disclosed herein except to the extent that such limitations are found in the appended claims.

What is claimed is:

1. A method of processing dough to improve baked flakiness, said method comprising:
   mixing flour, shortening and water and thereby form a dough mass, said shortening being in an amount sufficient to provide flakiness in a cooked product made from said dough mass;
   exposing said dough mass to a reduced pressure environment wherein the vacuum pressure is at least about 27.5 inches of mercury, said exposure is for a time of at least about ½ second with said time being that time period for which the vacuum pressure is at least equal to the specified vacuum pressure, during said exposing, said dough is allowed to volumetrically expand at least about 1.1 times its pre-exposure volume; and releasing said vacuum prior to commencement of cooking.

2. A method of processing dough to improve baked flakiness as set forth in claim 1 wherein:
said vacuum pressure is at least about 28 inches of mercury.

3. A method of processing dough to improve baked flakiness as set forth in claim 2 wherein:
said vacuum pressure is at least about 29 inches of mercury.

4. A method of processing dough to improve baked flakiness as set forth in claim 1, 2 or 3 wherein said volumetric expansion is at least about 1.5 times the pre-exposure volume.

5. A method of processing dough to improve baked flakiness as set forth in claim 4 including storing the dough wherein the thus exposed dough during storage is maintained in a gaseous environment substantially comprising $CO_2$.

6. A method of processing dough to improve baked flakiness as set forth in claim 4 including storing the dough wherein the thus exposed dough during storage is maintained in a gaseous environment substantially comprising $N_2O$.

7. A method of processing dough to improve baked flakiness, said method comprising:
mixing flour, shortening and water and thereby form a dough mass wherein said dough mass has shortening in an amount of at least about 24% by weight;

exposing said dough mass to a reduced pressure environment wherein the vacuum pressure is at least about 27.5 inches of mercury, said exposure is for a time of at least about ½ second with said time being that time period for which the vacuum pressure is at least equal to the specified vacuum pressure, during said exposing, said dough is allowed to volumetrically expand at least about 1.1. times its pre-exposure volume.

8. A method of processing dough to improve baked flakiness as set forth in claim 7 wherein said vacuum pressure is at least about 28 inches of mercury.

9. A method of processing dough to improve baked flakiness as set forth in claims 7 or 8 wherein said volumetric expansion is at least about 1.5 times the pre-exposure volume.

* * * * *